UNITED STATES PATENT OFFICE.

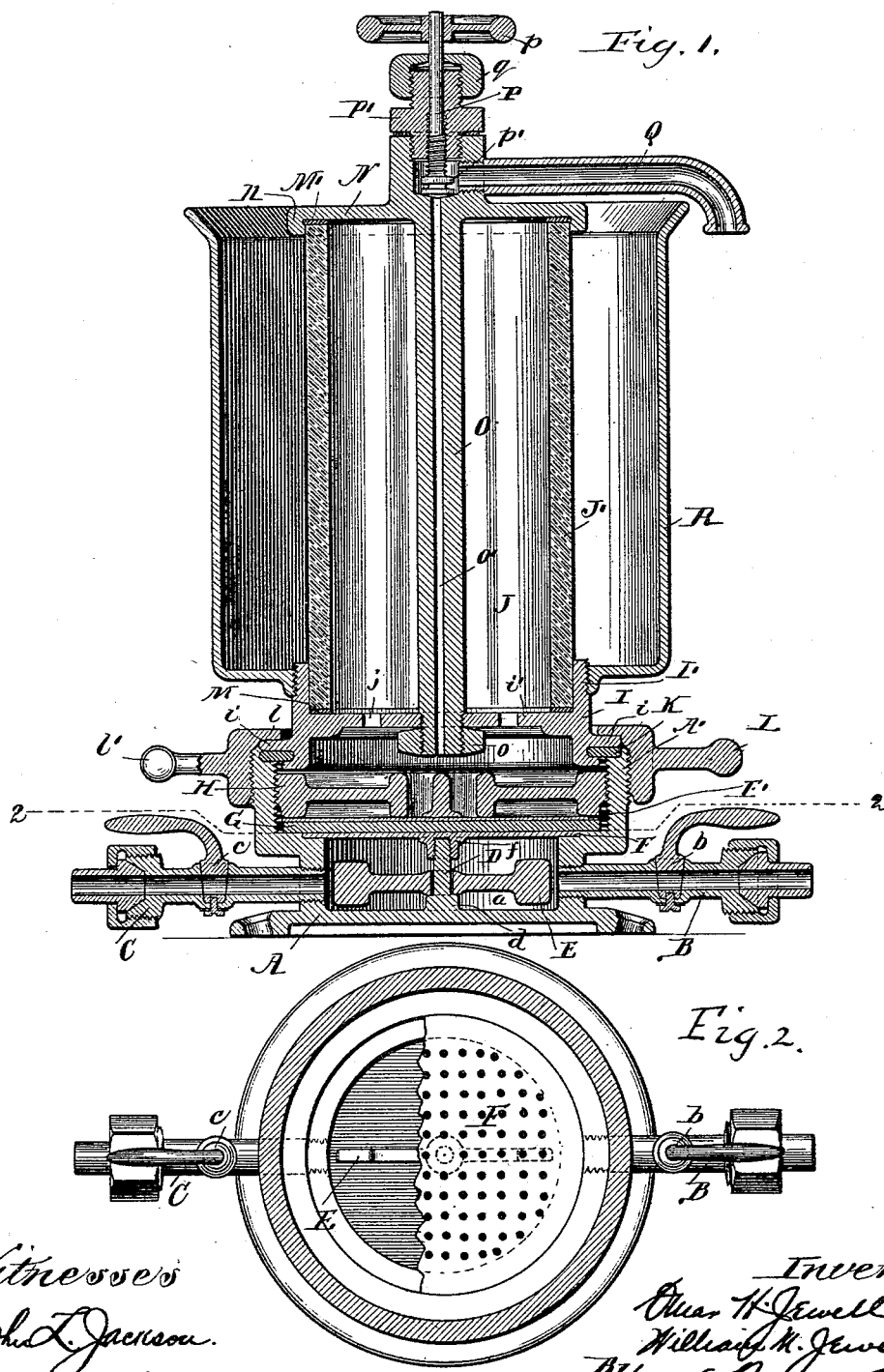

OMAR H. JEWELL AND WILLIAM M. JEWELL, OF CHICAGO, ILLINOIS.

FILTER.

SPECIFICATION forming part of Letters Patent No. 458,368, dated August 25, 1891.

Application filed April 7, 1891. Serial No. 388,045. (No model.)

*To all whom it may concern:*

Be it known that we, OMAR H. JEWELL and WILLIAM M. JEWELL, citizens of the United States, residing at Chicago, in the county of Cook and State of Illinois, have invented certain new and useful Improvements in Filters, of which the following is a specification, reference being had to the accompanying drawings, in which—

Figure 1 is a central vertical section, and Fig. 2 is a horizontal section on line 2 2 of Fig. 1.

Our invention relates to filters, and is especially adapted for use in filtering water in private houses; but it may also be enlarged and used for filtering large quantities of water.

In filters of this class as heretofore constructed very poor facilities have been afforded for thoroughly cleansing the filter from the impurities which are separated from the water; and one of the objects of our invention is to provide a new and improved filter that may readily and quickly be washed out and in which a simple and inexpensive filtering material may be used.

A second object of our invention is to provide a novel filter in which a moderate supply of water may always be had under pressure. We accomplish these objects as illustrated in the drawings, and as hereinafter set forth.

That which we regard as new will be set forth in the claims.

In the drawings, A indicates the base of the filter, upon which the filter is adapted to rest. The base A is preferably circular in shape and is provided with a cylindrical chamber $a$, into which a pipe B is fitted to conduct the water from a suitable source of supply into the chamber $a$. The pipe B is provided on its free end with a screw-thread, by means of which it may be coupled to the water-supply pipe. The pipe B is also provided with a suitable valve or stop-cock $b$, by which the supply of water may be regulated.

Upon the opposite side of the chamber $a$ to that in which the pipe B is fitted, is fitted another pipe C, which is similar in all respects to the pipe B and which is adapted to conduct water into or out of the chamber $a$. The pipe C is also provided with a stop-cock $c$, as shown in Fig. 1.

In the center of the chamber $a$ is a perpendicular shaft D, which is formed with a shoulder $d$ near its lower end, upon which shaft D is mounted a paddle-wheel E. The wheel E is adapted to be supported by the shoulder $d$ at a sufficient height to revolve readily in the chamber $a$, and is provided with projecting arms which project from the center of the wheel to a point near the interior wall of the chamber $a$. The object of this construction will be more fully stated hereinafter. The shaft D is screw-threaded at the top, as best shown in Fig. 1, and is adapted to receive a perforated metallic plate F, which is provided with a screw-threaded boss $f$ on its under side, which boss is adapted to screw upon the shaft D. The perforated plate F, when screwed upon the shaft D, is adapted to fit into a recess formed in the base A of the filter. The plate F may be made of aluminium or any other suitable material. The base A of the filter is provided at its upper end with an enlargement A', which is internally and externally screw-threaded, as shown in Fig. 1. The plate F is adapted to receive and support the filtering material G, which is composed of paper or other fibrous material. When paper is used, the filtering material G consists of a number of sheets of filtering paper; but any other compact fibrous material may be used, or, if desired, a porous disk. The filtering material G is held in place by a second perforated metallic disk F', which is somewhat larger than the plate F and extends almost to the interior wall of the enlarged portion A' of the base A.

H represents a heavy circular disk or binder, which is provided with a screw-threaded periphery, and is adapted to screw into the internal screw-threads upon the enlarged portion A' of the base A and to be screwed down upon the disk F' and filtering material G to tightly compress it against the shoulder formed by the enlarged portion A' of the base A. The binder H is provided at or near its center with holes, through which the water may pass upward to the reservoir above.

I indicates a circular casting, which forms the support for a reservoir J. The casting I is provided with flanges $i$ upon its lower end, which flanges are adapted to fit into the upper part of the base A. Gaskets or washers K are provided between the flanges $i$ and the base A, in order to form a more perfect connection between the casting I and the enlarged portion A' of the base A. The two parts A' and I are secured together by means of a coupling L, which is screwed upon the enlarged portion A' of the base A from above and is provided with a flange $l$ at the top, which is adapted to fit over the flange $i$ upon the casting I. By this construction the casting I may be firmly secured in place. The coupling L is provided with radial arms $l'$, by means of which it may be more readily screwed or unscrewed. The casting I is recessed at its under side to form a chamber, into which the water may flow after passing through the filtering material. At the upper part of the casting I is cast a horizontal plate $i'$, which extends over the chamber in the casting I, and is provided with holes $j$, through which the water may pass from the chamber into the reservoir J. The casting I is also provided at its upper portion with a circular flange I', which is externally screw-threaded at the top, as best shown in Fig. 1. The reservoir J is formed of a tube J', which is preferably made of heavy glass and is adapted to fit into the socket in the casting I, which is formed by the flange I' and rests upon a gasket or washer M, which is adapted to fit the socket formed by the flange I'. The reservoir J is made of any convenient depth and is provided at the top with a cap N, which is provided with a suitable marginal flange $n$ and is adapted to fit over the top of the tube J'. A gasket M' is also placed between the cap N and the top of the tube J' in order to form an air-tight joint. The cap N is provided at its center with a depending tube O, which extends downward centrally through the reservoir J and plate $i'$ and is provided on its lower end with screw-threads adapted to receive a nut $o$, which nut is screwed upon the screw-threads of the tube beneath the plate $i'$. By means of the nut $o$ upon the tube O the cap N may be tightly drawn down, whereby the reservoir J will be hermetically sealed. The gaskets M M' are preferably made of rubber and aid in tightly sealing the reservoir J. The tube O is provided with a central passage $o'$, which extends upward to a valve-seat $p'$, which is formed in the upper portion of the cap N. A valve P is fitted in the valve-seat $p'$, by means of which the passage $o'$ may be opened or closed, as desired. The valve P is provided with a wheel or handle $p$, by means of which it may be operated, and is also provided with a stuffing-box P', which is secured in place by a screw-nut gland $q$.

Q indicates a discharge-tube leading from the chamber of the valve P, by means of which the water may be drawn off from the filter.

R indicates an exterior tubular shell, which is somewhat larger than the reservoir J and is adapted to be screwed upon the casting I, as shown in Fig. 1. The tube R is preferably made of the same depth as the reservoir J and is provided at the bottom with a discharge-pipe, (not shown,) by means of which the water may be drawn off from the interior of the tube R.

The cap N, tube O, and valve-seat $p'$ are preferably cast in one piece, as the necessity of making several connections is thereby avoided; but they might be cast separately without in any way modifying the operation of the filter.

The operation of our filter is as follows: The valve $b$ being opened, the water will flow from the source of supply through the pipe B into the chamber $a$, and thence it will be forced through the perforated disk F, filtering material G, and perforated disk F', the pressure of the water from the source of supply being sufficient to force it through the filtering material. After passing through the perforated disk F', the water will flow through the passage in the binder H into the chamber in the lower part of the casting I. When the valve P is open, the water will flow from the chamber in the casting I directly through the tube O and out at the delivery-tube Q. When the valve P is closed, the water will flow from the chamber in the casting I, through the holes $j$ into the reservoir J, into which it will continue to flow until the air in the reservoir is compressed sufficiently to equalize the pressure from the source of supply. The water will also fill the tube O to the same depth to which it fills the reservoir. When the water in the reservoir J has sufficiently compressed the air, the water will cease to flow until the valve P is opened, when the pressure of the air in the reservoir J will cause the water in the reservoir to flow downward through the holes $j$ in the plate $i'$ into the chamber in the casting I, and thence upward through the tube O and out at the delivery-tube Q. The force of the discharge at the discharge-tube Q will be determined by the amount of water in the reservoir J. Whenever any water is drawn from the filter, the operation of filtering will be resumed and will continue until the air in the reservoir J is again compressed sufficiently to equalize the pressure of the water. During the process of filtering, the heavier impurities which are separated from the water will accumulate in the chamber $a$ in the base A and upon the perforated disk F. When it is desired to remove these impurities, the valve $c$ in the tube C may be opened, when the water will flow from the tube B through the chamber $a$ and out at the tube C. In the passage of the water through the chamber $a$ it will strike the arms of the wheel E and will cause it to revolve, the rapidity of the revolutions of the wheel being determined by the force of the water. By the use of this device the water will be violently agitated in the chamber $a$ and all the free impurities will be washed from the perforated disk and from the interior of the chamber and will pass out at the tube C. The rotary agitator or wheel E materially aids in cleansing the impurities from the bottom of the filtering material, and therefore it performs a useful function and is a very desirable feature of the improved filter. It is evident that it is immaterial which of the tubes B or C is used as the supply-tube, as either one may be used for that purpose, the other being then used as the outlet-tube.

When the filter has been used for a greater or less time, depending upon the quality of the water which is filtered, the filtering material will become impure and should be replaced by fresh material. In order to do this the coupling L is unscrewed, when the reservoir J and casting I may be removed. The binder H is then unscrewed, when the perforated disk F' may also be removed, exposing the filtering material G. After exchanging the old filtering material for new the different parts are replaced in the proper order, when the filter will again be ready for use. By the use of the disks F F' on either side of the filtering material G, when the binder H is tightly screwed down upon the disk F', friction between the filtering material G and the binder H is avoided, so that the filtering material is kept smooth and in better condition for filtering the water. The perforated disk F also acts to strain the larger particles from the water before it enters the filtering material.

When it is desired to cool the water in the reservoir J, the tube or cylinder R may be filled with ice. The operation of the filtering apparatus, however, is not affected by the use of the cooling apparatus.

That which we claim as new, and desire to secure by Letters Patent, is—

1. The combination, with a filter having at its bottom a chamber for receiving unfiltered water, of a filtering material located above said chamber, a rotary agitator arranged in the chamber beneath the filtering material and operated by the inflowing water, a chamber arranged above the filtering material, an air-tight reservoir located over and communicating with the chamber above the filtering material, a tube extending through the reservoir and connecting the chamber above the filtering material with a discharge-pipe, and a valve for opening and closing the passage in the tube, substantially as described.

2. The combination, with a filter having an inlet for unfiltered water at the bottom, a filtering material located above said inlet, and a chamber over said filtering material, of an air-tight reservoir located over and communicating with said chamber, a tube O, extending through the reservoir and connecting the chamber with a discharge-pipe, and a valve for opening or closing the passage in said tube, substantially as and for the purpose specified.

3. In a filter, the combination, with a base A, having a chamber $a$, said base having an enlarged upper portion A', internally and externally screw-threaded, perforated disks F F', supported in the portion A' of the base, filtering material adapted to be held between two disks F F', and a binding-screw H, adapted to be screwed into the portion A' to tightly press the disks F F' and filtering material upon their support, of a casting I, adapted to fit into the upper part of the portion A', coupling L for securing the casting I to the portion A', perforated plate $i'$ in said casting, reservoir J, supported by said casting, and a cap N, adapted to close the upper part of the reservoir, said cap having valve P, discharge-tube Q, and a tube O, extending downward through the reservoir and adapted to receive a nut $o$ upon its lower end to tightly unite the several sections, substantially as described.

OMAR H. JEWELL.
WILLIAM M. JEWELL.

Witnesses:
JOHN L. JACKSON,
NELLIE MCKIBBEN.